United States Patent
Kuki et al.

(10) Patent No.: US 7,314,108 B2
(45) Date of Patent: Jan. 1, 2008

(54) DUST COVER STRIKE PLATE AND SUSPENSION MECHANISM HAVING THE SAME

(75) Inventors: Norimasa Kuki, Komaki (JP); Koichi Matsuda, Nagoya (JP); Hiroki Sunouchi, Anjo (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 445 days.

(21) Appl. No.: 10/888,096

(22) Filed: Jul. 9, 2004

(65) Prior Publication Data

US 2005/0012292 A1    Jan. 20, 2005

(30) Foreign Application Priority Data

Jul. 16, 2003   (JP) .............................. 2003-197598

(51) Int. Cl.
  *B62D 25/16*   (2006.01)
(52) U.S. Cl. ..................................... 180/84; 188/322.12
(58) Field of Classification Search ......... 280/124.155, 280/124.147; 180/84; 188/322.12
  See application file for complete search history.

(56) References Cited

U.S. PATENT DOCUMENTS 5,676,355 A    10/1997  Hayashi et al.
2003/0209395 A1*  11/2003  Fukaya ................. 188/322.12
2003/0218286 A1*  11/2003  Miyazaki et al. .......... 267/220
2005/0247531 A1*  11/2005  Oota ..................... 188/322.19

FOREIGN PATENT DOCUMENTS

| JP | 62-13237  | 1/1987 |
|----|-----------|--------|
| JP | 2535936   | 2/1997 |
| JP | 10-292840 | 11/1998 |
| JP | 2000-6630 | 1/2000 |
| JP | 3205480   | 6/2001 |

OTHER PUBLICATIONS

Chinese Office Action dated Sep. 22, 2006, from corresponding Chinese Application No. 200410069605.2 (English translation enclosed).

* cited by examiner

*Primary Examiner*—Paul N. Dickson
*Assistant Examiner*—Barry Gooden, Jr.
(74) *Attorney, Agent, or Firm*—Beyer Weaver LLP

(57) ABSTRACT

A dust cover strike plate in a suspension mechanism having a dust cover disposed about a shock absorber and arranged radially inward of a coil spring, and being superimposed on an inner portion of an upper face of a lower spring support member, and includes an abutting face opposite to a lower end of the dust cover in an axial direction. The abutting face has an axial projection height from the lower spring support member that is varied in a circumferential direction corresponding to an incline angle of the lower spring support member to the center axis of the shock absorber so that the abutting face is arranged on a plane substantially perpendicular to the center axis of the shock absorber, with which the lower end of the dust cover comes into contact. A suspension mechanism equipped with the dust cover strike plate is also enclosed.

7 Claims, 3 Drawing Sheets

DUST COVER STRIKE PLATE AND SUSPENSION MECHANISM HAVING THE SAME

INCORPORATED BY REFERENCE

The disclosure of Japanese Patent Application No. 2003-197598 filed on Jul. 16, 2003 including the specification, drawings and abstract is incorporated herein by reference in its entirety.

BACKGROUND OF THE INVENTION

1. Field of the Invention

The present invention relates to a technology pertaining to a suspension mechanism constituting part of the wheel suspension system of an automobile. More particularly, the present invention is concerned with a dust cover strike plate for providing a dust cover abutting face in an automobile suspension mechanism, and a suspension mechanism having the dust cover strike plate attached thereto.

2. Description of the Related Art

Automobile suspension mechanisms to date, as illustrated in FIG. 4, employ a shock absorber 12 composed of a cylinder 14 and a piston 16, which is installed on an automobile with the cylinder 14 mounted to a hub carrier or the like on the side of a wheel 10, and the piston rod 16 mounted to a body 11 of the automobile. One type of suspension mechanism known in the art is a suspension mechanism of strut or four-link design, having a coil spring 20 assembled fitting about the outside of the shock absorber 12, supported at its upper end by an upper spring support member 22 disposed on an upper support 18 or the body 11, and supported at its lower end by an annular disk-shaped lower spring support member 24 projecting from an outer circumferential surface of the cylinder 14, whereby biasing force of the coil spring 20 is exerted between the body 11 and a suspension arm 21, via the shock absorber 12.

This type of suspension mechanism is subjected to change in the mounting angle of the shock absorber 12 with respect to the body 11, due to displacement of the hub carrier in associating with pivotal motion of the suspension arm during driving of the automobile. It has been pointed out that, since at this time the point of application of external force exerted through the wheel 10 diverges from the center axis of the shock absorber 12, and since bending moment is produced in shock absorber 12 due to spring action of the upper support 18 and the like, there is a likelihood of adverse effects by this bending moment on operation and durability at portions of the piston 16 that slide against the cylinder 14, and the like.

To cope with this drawback, the conventional suspension mechanism, as shown in FIG. 4, employs a design wherein the lower spring support member 24, which projects from the cylinder 14 of the shock absorber 12 and supports the lower end of the coil spring 20, is inclined in one direction and eccentric with respect to a plane perpendicular to the center axis of the coil spring 20, so that the axis of the coil spring 20 is inclined relative to the center axis of the shock absorber 12. That is, by inclining the center axis of the coil spring in this way, the direction in which the biasing force of the coil spring 20 is applied during contraction of the shock absorber 12 is eccentric with respect to the center axis of the shock absorber 12, whereby the biasing force can be applied in a direction that cancels the bending moment exerted on the shock absorber 12 during contracting motion of the shock absorber 12 as described above.

As disclosed in Citation 1 (JP-B-3205480), a shock absorber typically has a dust cover that is attached thereto with the piston rod and cylinder upper portion being covered by the dust cover in order to prevent these from being splashed by mud, water, or the like, so that sliding portions of the piston rod are protected.

With suspension mechanisms of such conventional design, it is revealed that the dust cover attached exhibits exceedingly poor durability in some instances, and it is recognized that the dust cover is readily to crack, and when attached in a hanging fashion tends relatively quickly to experience splitting in the lengthwise medial portion, resulting in the problem of the lower portion falling off. Research conducted by the inventors regarding this phenomenon showed no particular problem with the materials or durability of the dust cover per se, which led to the conclusion that the reason must lie in some structural element of the suspension mechanism.

[Citation 1]
JP-B-3205480
[Citation 2]
JP-A-2000-6630
[Citation 3]
JP-U-62-13237

SUMMARY OF THE INVENTION

It is therefore one object of this invention to provide a dust cover strike plate of novel construction that is employable in a suspension mechanism of a design having a projecting lower spring support member inclined with respect to the cylinder of the shock absorber, and that can be utilized effective to ensure durability of the dust cover. Another object of the invention is to provide a suspension mechanism employing the dust cover strike plate.

The above and/or optional objects of this invention may be attained according to at least one of the following modes of the invention. Each of elements in the following modes may be employed in possible optional combinations. It is to be understood that the modes or technical features of the invention are not limited to the following disclosures, but may otherwise be recognized based on the teachings of the present invention disclosed in the entire specification and drawings or that may be recognized by those skilled in the art in the light of the present disclosure in its entirety.

The inventors carried out extensive testing and research in view of the problems with durability of dust covers in the conventional suspension mechanism described above, and discovered possible causes of the problems. Namely, with a suspension mechanism constructed with the lower spring support member projecting from and inclined with respect to a cylinder of the shock absorber, the lower end of the dust cover mounted coaxially and externally of the shock absorber comes into abutting contact with the lower spring support member, when the shock absorber undergoes appreciable contracting movement. In this state, since an abutting face of the lower spring support member is inclined, bending moment is applied to the dust cover, causing it to bend or bow and deform, as a result of which strain or stress concentrations are produced in the dust cover. The present invention was perfected on the basis of this new discovery.

The principle of the present invention provides a dust cover strike plate for use in a suspension mechanism having: a shock absorber installed between a wheel side and a body side of an automobile with a cylinder thereof mounted on the wheel side and a piston rod thereof mounted on the body side; a coil spring disposed externally about the shock absorber with an upper end thereof supported by an upper spring support member disposed on the body side and an lower end thereof supported by a lower spring support member fixed on and projecting from an outer circumferential surface of the cylinder of the shock absorber, while being inclined with respect to an center axis of the shock absorber; and a tubular dust cover disposed externally about the shock absorber with an upper end thereof supported by a fixing portion of the piston rod that is fixed to the dust cover so as to be arranged radially inward of the coil spring in a hanging fashion, the dust cover strike plate being adapted to be superimposed on and attached to an inner circumferential portion of an upper face of the lower spring support member that support the lower end of the coil spring, and comprising: an abutting face situated opposite to an axial lower end of the dust cover in an axial direction of the shock absorber, and having axial projection height from the lower spring support member that is varied in a circumferential direction of the shock absorber corresponding to an incline angle of the lower spring support member with respect to the center axis of the shock absorber so that the abutting face situated opposite to the axial lower end of the dust cover is arranged on a plane substantially perpendicular to the center axis of the shock absorber, wherein the axial lower end of the dust cover is brought into abutting contact with the abutting face during contracting motion of the shock absorber.

With the dust cover strike plate of construction according to the invention attached to the lower spring support member, an axial upper face of the dust cover strike plate defines a face of the lower spring support member, which is situated opposite to and spaced away from the lower end of the dust cover in the axial direction of the shock absorber. With this state, the axial upper face of the dust cover strike plate is arranged extending in an axis-perpendicular direction of the center axis of the shock absorber. Therefore, when the lower end of the dust cover comes into abutting contact with the dust cover strike plate, reaction force to the abutting contact is exerted in the axial direction of the dust cover. Thus, the dust cover consistently undergoes compressive deformation in the direction of its center axis, which is conformed to its elastic principal axis, thereby avoiding creation of local strain or stress concentration, so that good durability is achieved.

According to the present invention, improved durability of the dust cover can be achieved without any special machining or modification of the shock absorber or upper and lower spring support members, by simply installing a dust cover strike plate of specific construction. This makes it possible to readily reduce to practice the invention, without any adverse effect on the characteristics inherent to the suspension mechanism.

Additionally, where such a dust cover strike plate is installed, it becomes possible to avoid the dust cover directly abutting the lower spring support member. This provides an advantage in terms of preserving the anticorrosion treatment on the lower spring support member, also affording improved durability of the suspension mechanism itself.

The material of which the dust cover strike plate is fabricated is not subject to any particular limitations. Preferably, rubber elastic bodies or synthetic resins are employed with a view to moderate abutting noise and impact when contacted by the dust cover.

In the dust cover strike plate of construction according to the invention, the abutting face is positioned on the same plane extending in the axis-perpendicular direction with respect to the center axis of the shock absorber, and the lower end of the dust cover abuts against the abutting face in generally simultaneous fashion, during compressing motion of the shock absorber. This abutting face may be formed so as to extend circumferentially continuously over an entire circumference thereof, or the abutting face may be divided into a plurality of abutting face sections in the circumferential direction of the shock absorber, for example. In the latter case, air passages are formed between the abutting face sections situated adjacently in the circumferential direction. These air passages permit intake and expulsion of air between the cover interior and the outside, in association with changes in capacity of the dust cover internal space occurring during stretching/contracting deformation of the dust cover, as well as to avoid unwanted noise in association with intake and expulsion of air, or irregular deformation of the dust cover in association with air pressure changes.

A design in which the abutting face is divided into a plurality of sections may be produced, for example, by forming a plurality of substantially independent convex bodies of block configuration, and attaching each of these separately at a predetermined location of the lower spring support member through bonding or the like. Preferably, is employed an annular configuration in which a plurality of convex bodies of block configuration are linked together at their basal ends, since this affords easier handling and mounting of the dust cover strike plate.

Additionally, where the abutting face is divided into a plurality of sections in the circumferential direction, it is preferable to form slot-like gaps that function as drain passages, situated between adjacent abutting face sections in the circumferential direction. By forming such slot-like gaps, rain water, mud or the like falling onto the lower spring support member can rapidly drain from the center portion of the lower spring support member, so as to avoid becoming collected therein. This prevents corrosion and other adverse effects of rainwater etc. not only on the dust cover strike plate, but also on the lower spring support member itself.

In particular where the dust cover strike plate of present construction is attached to a suspension mechanism wherein the inner circumferential portion of the lower spring support member has a tapered configuration that inclines axially downward of the shock absorber, while going towards the inner periphery thereof, the dust cover strike plate, preferably, has a tapered face corresponding to the tapered configuration of the lower spring support member at a lower face thereof, which is superimposed against the upper face of the inner circumferential portion of the lower spring support member, so that the dust cover strike plate is superimposed and positioned against the upper face of the lower spring support member. As discussed above, since the position of tapered configuration formed on the lower spring support member is ingeniously used in order to mate with the dust cover strike plate during assembly, it is possible to prevent mispositioning of the dust cover strike plate, and to thereby consistently achieve, by means of simple construction, the objective advantages mentioned hereinabove, such as improved durability of the dust cover.

Additionally, the dust cover strike plate of construction according to the invention may advantageously be formed with a design wherein the dust cover strike plate is integrally formed with an inner peripheral edge portion of a lower spring seat that is superimposed on the upper face of the lower spring support member so as to be situated between the upper face of the lower spring support member and the coil spring.

While it is well known common practice to attach to the lower spring support member a spring seat situated between it and the coil spring for the purpose of reducing or preventing damage or noise, it is possible, utilizing the inner peripheral edge portion of the lower spring seat, to form the dust cover strike plate integrally with the lower spring seat. This arrangement, as compared to the case where the dust cover strike plate and the spring seat are constituted as separate members, makes it possible to avoid problems such as higher cost associated with a greater number of parts, an increased number of processing steps. Further, since the dust cover strike plate and the lower spring seat, which must be oriented a certain way for installation, are formed in the form of an integral unit, it becomes readily possible to stably attach the dust cover strike plate to the lower spring support member.

In order to address problems relating to durability of the dust cover in a suspension mechanism of the conventional design described hereinabove, the invention further provides a suspension mechanism a shock absorber adapted to be installed between a wheel side and a body side of an automobile with a cylinder thereof fixable to the wheel side and a piston rod thereof fixable to the body side; a coil spring disposed externally about the shock absorber with an upper end thereof supported by an upper spring support member disposed on the body side and an lower end thereof supported by a lower spring support member fixed on and projecting from an outer circumferential surface of the cylinder of the shock absorber, while being inclined with respect to an center axis of the shock absorber; a tubular dust cover disposed externally about the shock absorber with an upper end thereof supported by a fixing portion of the piston rod that is fixed to the body side so as to be arranged radially inward of the coil spring in a hanging fashion, and being formed as a generally cylindrical elastic body having a stretching/contracting portion of bellows configuration situated at least in an axially medial portion thereof, and a dust cover strike plate constructed according to any one of claims 1-4, and superimposed on and attached to an inner circumferential portion of an upper face of the lower spring support member.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENT

A fuller understanding of the invention is provided through the following detailed description of the embodiments, made with reference to the accompanying drawings. In the following description, the vertical direction shall as a general rule be considered to refer to the vertical direction in FIG. 1. The vertical direction shown in FIG. 1 may be inclined by an appropriate angle from plumb-bob vertical, depending on the condition of mounting on the automobile, or the suspension configuration.

Figure 1:
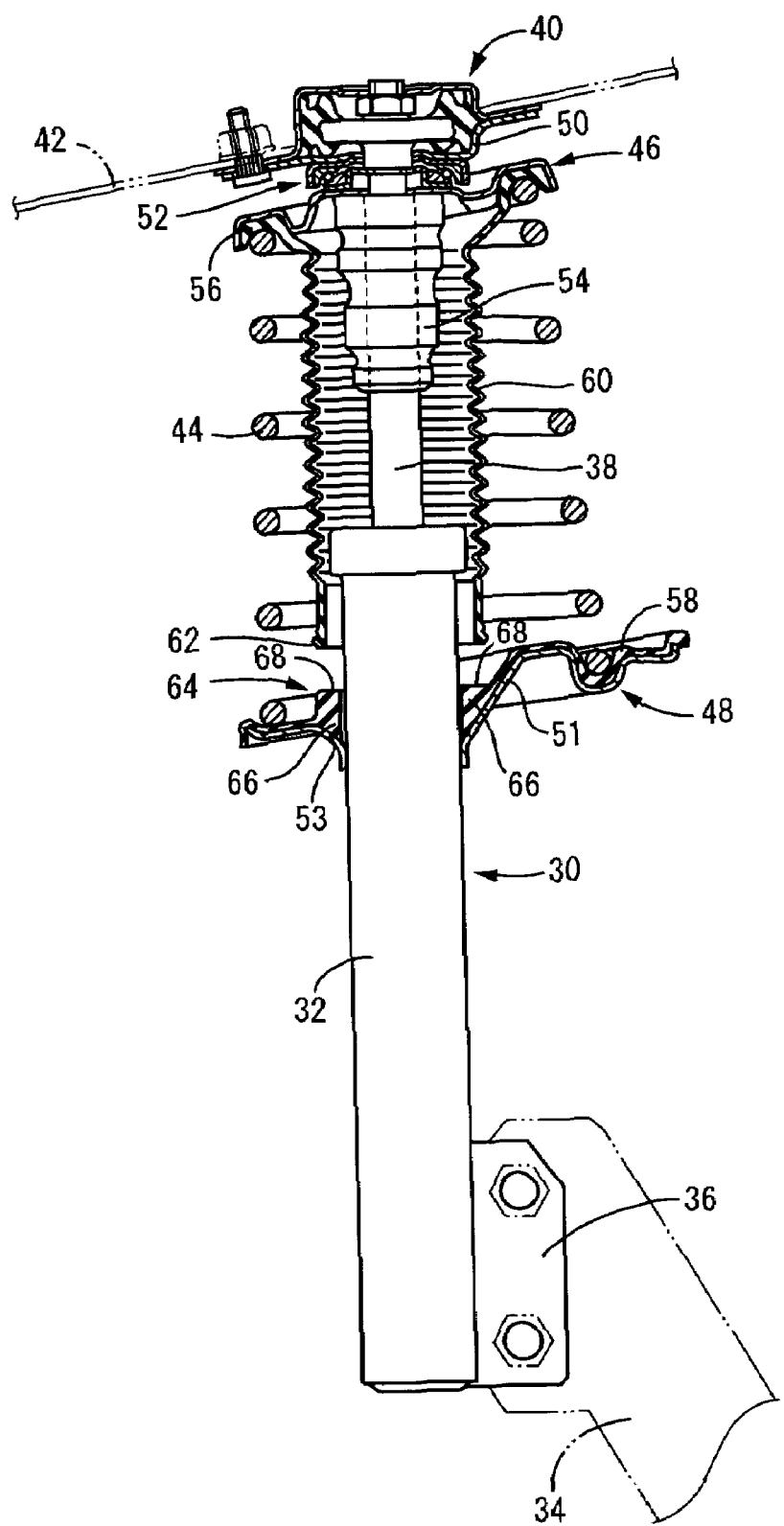
FIG. 1 is a vertical cross sectional view schematically showing a principle part of a suspension mechanism equipped with a dust cover strike plate constructed according to one preferred embodiment of the invention.

FIG. 1 depicts in simplified form one embodiment of a suspension mechanism having attached a dust cover strike plate of construction according to the invention. In the drawing, 30 denotes a shock absorber of conventional known design, having a piston (not shown) slidably attached to a cylinder 32, and a piston rod 38 which projects from the piston and extends outwardly upward in the axial direction of cylinder 32. The shock absorber 30 is mounted on an automobile, with a mounting fixture 36 fastened to the lower end of the cylinder 32 mounted on a hub carrier 34, and the upper end of the piston rod 38 mounted on a body 42 of the automobile via an upper support 40.

In this installed state, the piston rod 38 extends and retracts relative to the cylinder 32 in association with motion of the suspension mechanism caused by an irregular road face during driving of the automobile, whereby the shock absorber 30 performs attenuating action for the suspension mechanism, on the basis of flow resistance of oil enclosed within the cylinder 32.

In proximity to the upper end of the piston rod 38 is disposed a generally annular plate-shaped upper spring support member 46, while in the axially medial portion of cylinder 32 is disposed a generally annular plate-shaped lower spring support member 48. The upper spring support member 46 and the lower spring support member 48 are arranged in opposition to each other a predetermined distance apart in the lengthwise direction of the shock absorber 30, with the size of the gap between the opposing faces of the support members 46, 48 changing during extension and contraction of the shock absorber 30.

A large-diameter coil spring 44 is externally disposed about the shock absorber 30, with the upper end of the coil spring 44 supported abutting the lower face of the upper spring support member 46, while the lower end of the coil spring 44 is supported abutting the upper face of the lower spring support member 48. With this arrangement, during extension and contraction of the shock absorber 30, biasing force of the coil spring 44 in the extension direction is applied in the extension direction to the shock absorber 30.

The upper and lower spring support members 46, 48 are inclined by a predetermined angle with respect to the axis-perpendicular direction of the shock absorber 30, with the two spring support member 46, 48 arranged in opposition in a direction inclined by a predetermined angle with respect to the center axis of the shock absorber 30. By means of this arrangement, biasing force of the coil spring 44 when the shock absorber 30 undergoes extension/contraction acts on the shock absorber 30 as bending moment and working force in the direction of extension. Then, in the known manner, bending moment produced in the shock absorber 30 as a result of the point of application of external force to the shock absorber 30 via the wheel diverging from the center axis of the shock absorber 30, or of spring action on the part of the upper support, can be reduced in canceling manner on the basis of bending moment by the coil spring 44, thereby improving durability and operation of the shock absorber 30.

The upper spring support member 46 is attached via a bearing 52 to a metallic housing fixture 50 of the upper support 40, installed at the upper end of the piston rod 38. This arrangement permits rotation of the hub carrier 34 in association with wheel steering, to which the cylinder 32 of the shock absorber 30 is attached. This attachment structure, including the upper support 40, for attaching the upper spring support member 46 via the bearing 52 is of known design for automobile front wheel suspension mechanisms, and therefore detail description of the structure is omitted herein.

The lower spring support member 48 has a tapered portion 51 at its inner circumferential portion that gradually projects downward as its goes towards its inner periphery or center. The inner periphery of the tapered portion 51 is welded in place fitted around the outside of the cylinder 32 of the shock absorber 30. A water drain opening 53 is formed at an appropriate location along the inner peripheral edge of tapered portion 51, so that mud or the like falling onto the upper face of the lower spring support member 46 can drain off quickly.

A bump stopper 54 of the kind that is a known element of conventional suspension mechanisms is installed on shock absorber 30. The bump stopper 54 consists of a thick-walled round cylinder of elastic material such as a rubber elastic body, and is installed fitting onto the exterior of the piston rod 38 at the upper end thereof. When the shock absorber 30 undergoes appreciable contracting motion, the bump stopper 54 undergoes elastic deformation while compressed in the axial direction between the upper spring support member 46 and the cylinder 32, thereby imparting nonlinear spring characteristics to contracting motion of the shock absorber 30, and providing cushion-wise limitation of the extent of contraction by the shock absorber 30.

Further, an upper spring seat 56 and a lower spring seat 58 are respectively superimposed onto a lower face of the upper spring support member 46 and an upper face of the lower spring support member 48, which faces support the two ends of the coil spring 44 attached thereto. That is, the coil spring 44 is arranged with the upper and lower ends thereof overlapping the upper spring support member 46 and the lower spring support member 48 via the upper spring seat 56 and the lower spring seat 58, thereby avoiding the coil spring 44 from directly abutting the upper spring support member 46 and the lower spring support member 48.

The upper spring seat 56 overall has a narrow, annular plate shape, and is attached covering the entire circumference of the outer circumferential portion of the lower face of the upper spring support member 46, which is overlapped by the upper end of the coil spring 44. The inner peripheral edge of the upper spring seat 56 projects downwardly in a narrowing tapered cylinder configuration, and the lower end thereof has integrally formed a dust cover 60 of cylindrical bellows configuration extending down by a predetermined length. The center axis of the dust cover 60 is inclined by a predetermined amount relative to the center axis of the upper spring seat 56. Therefore, with the upper spring seat 56 attached superimposed on the lower face of the upper spring support member 46, the dust cover 60 is positioned generally coaxially with respect to the shock absorber 30, and extending downward and spaced apart by a predetermined distance from the upper end of the cylinder 32 and the outer periphery of the piston rod 38.

By means of this arrangement, the dust cover 60 is attached to the shock absorber 30 so as to cover the upper end of the cylinder 32 and the entire length of the piston rod 38 extending therefrom. The bellows configuration of the dust cover 60 is formed of a series of peaks and valleys extending through planes perpendicular to the center axis of the shock absorber 30, in alternating fashion at appropriate pitch along the center axis direction of the shock absorber 30. The lower end of the dust cover 60 is of cylindrical configuration that over a predetermined length does not employ bellows configuration. The lower end 62 thereof extends in a plane perpendicular to the center axis of shock absorber 30. In this embodiment, the lower end 62 takes the form of an annular rib having increased thickness on the outer peripheral side to improve strength.

Figure 2:
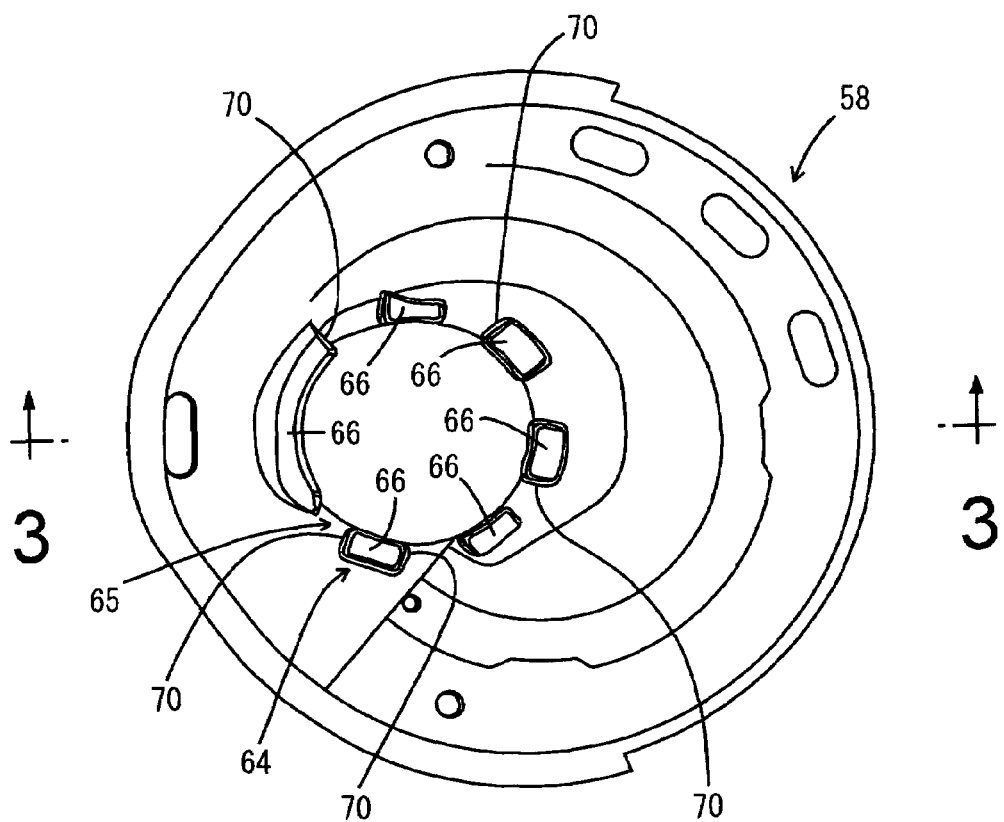
FIG. 2 is a top plane view of the dust cover strike plate used in the suspension mechanism of FIG. 1.
Figure 3:
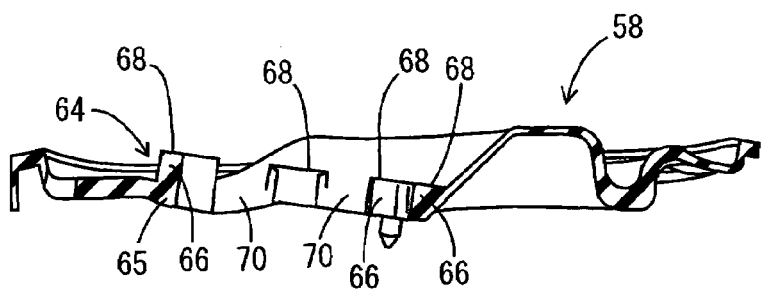
FIG. 3 is a cross sectional view taken along line 3-3 of FIG. 2.
Figure 4:
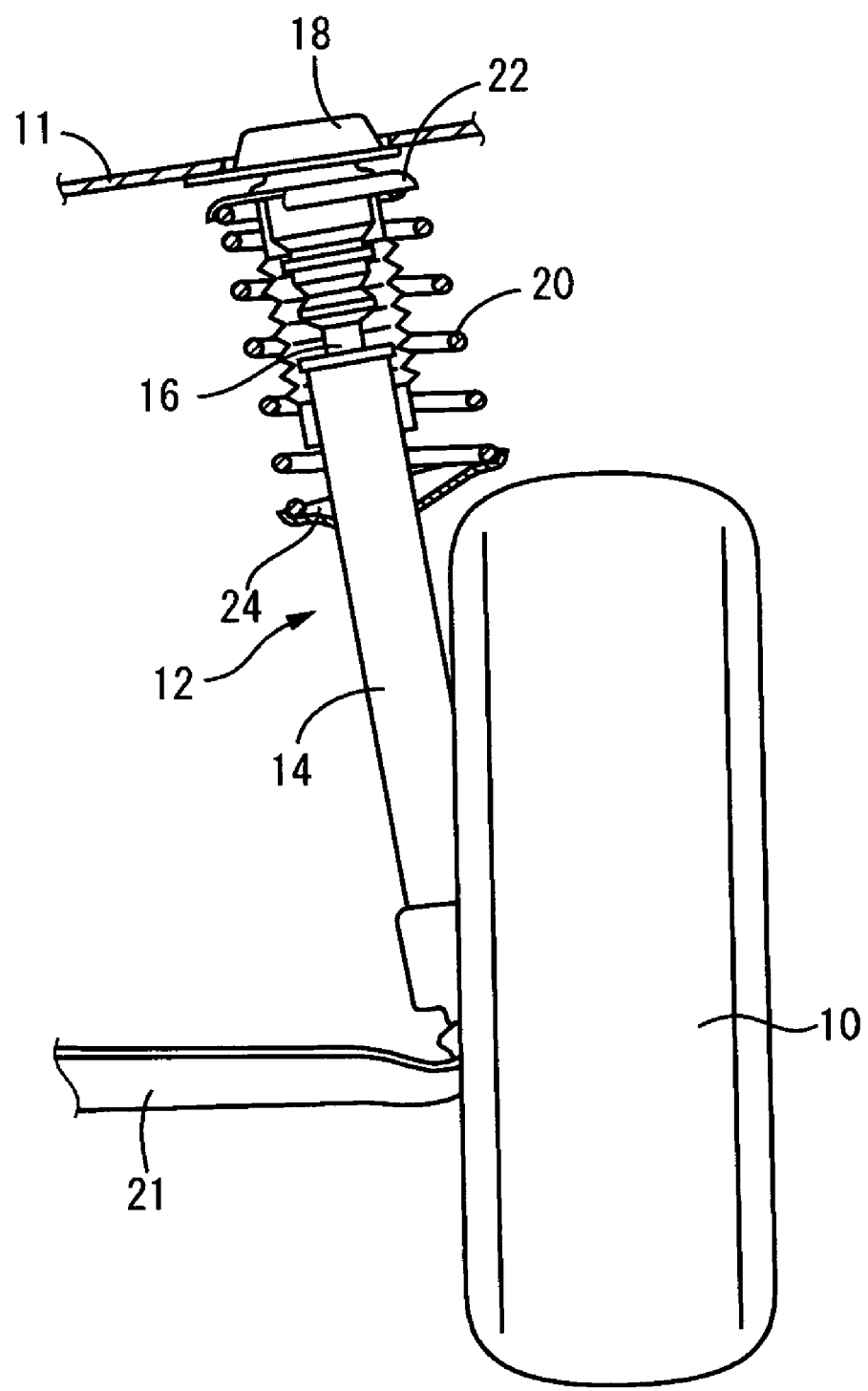
FIG. 4 is a view illustrating a principle part of a suspension mechanism of conventional construction.

On the other hand, as shown in FIGS. 2 and 3, the lower spring seat 58 has a wide, annular plate shape, and is attached covering substantially the entire upper face of the lower spring support member 48 overlapped by the lower end of the coil spring 44. As is apparent from FIG. 1, the lower spring seat 58 has a shape corresponding to that of the upper face of the lower spring support member 48, and is disposed overlapping the upper face of the lower spring support member 48 in generally close contact therewith.

The dust cover strike plate 64 is integrally formed on the inner circumferential portion of the lower spring seat 58.

This dust cover strike plate 64 comprises an annular base portion 65 composed of the inner circumferential portion of the lower spring seat 58, and a plurality of abutment projections 66 of block configuration, projecting upward at several locations along the circumference of the base portion 65. The bottom face of the base portion 65 is tapered, and is positioned superimposed in close contact with the upper face of the tapered portion 51 of lower spring support member 48. The plurality of abutment projections 66 are spaced apart at predetermined spacing in the circumferential direction, each having a rectangular block shape, bowed shape, or other appropriate shape, and with the abutment projections 66 projecting up to mutually different heights. A projecting end face 68 of each abutment projection 66, functioning as an abutting face section, is situated in a single plane perpendicular to the center axis of the shock absorber 30, thereby cooperating together to provide an abutting face.

Namely, the lower spring support member 48 supporting the dust cover strike plate 64 superimposed thereon is inclined by a predetermined amount with respect to the center axis of the shock absorber 30. However, since the abutment projections 66 vary in projecting height circumferential direction, by an amount corresponding to this incline angle, the projecting end faces 68 of the abutment projections 66 are situated in a single plane perpendicular to the center axis of the shock absorber 30.

The projecting end faces 68 of the abutment projections 66 are situated in opposition to, and spaced apart a predetermined distance away in the axial direction from, the lower end 62 of the dust cover 60 which is supported suspended on the upper spring support member 46 in the direction of the center axis of the shock absorber 30. The opposing lower end 62 of the dust cover 60 and the projecting end faces 68 of the abutment projections 66 are positioned at generally equal distance between their opposed faces, all the way around the circumference.

With the suspension mechanism of the present embodiment having the above-described construction, when the shock absorber 30 undergoes appreciable contract due to being subjected to a large load, such as when the automobile driver over the block, the dust cover, together with the piston rod 38 of the shock absorber 30, undergoes displacement in the axial direction towards the cylinder 32 end, whereupon the lower end 62 of the dust cover 60 comes into abutting contact with the dust cover strike plate 64 attached to the lower spring support member 48.

With this respect, the projecting end faces 68 of the abutment projections 66 on the dust cover strike plate 64, which is now abutted by the lower end 62 of the dust cover 60, are positioned in opposition to the lower end 62 of the dust cover 60 around their entire circumferences in the circumferential direction, and spaced apart therefrom by generally equal distance in the center axis direction which is the direction of extension/contraction of the shock absorber 30. With the help of this arrangement, when the shock absorber 30 undergoes contracting motion, the lower end 62 of the dust cover 60 comes into abutment with each of the projecting end faces 68 of the abutment projections 66, in a generally simultaneously manner around the entire circumference in the circumferential direction.

Accordingly, when the lower end 62 of the dust cover 60 comes into abutment with the dust cover strike plate 64, reaction force is exerted towards the axial direction of the dust cover 60, whereupon the dust cover undergoes stable compressive deformation in the direction of its center axis, which is the direction of folding of the bellows structure, thereby avoiding creation of localized areas of strain or stress, and providing good durability.

In the present embodiment, the lower spring seat 58, which is a component widely used to date in suspension mechanisms, is utilized to produce the dust cover strike plate 64, so that there is no need for new parts or assembly processes, making the arrangement exceedingly simple to reduce to practice, and avoiding any adverse effects on function and operation of the shock absorber 30.

Additionally, the use of such a dust cover strike plate 64 eliminate direct abutting contact of the lower end 62 of the dust cover 60 against the lower spring support member 48, thereby ameliorating noise or impact resulting from such direct abutting contact, as well as effectively preventing damage to a coating on the lower spring support member 48 caused by such abutting contact, and corrosion resulting therefrom. Thus, durability of the suspension mechanism as a whole may be effectively improved as well.

In the present embodiment, the abutment projections 66 of the dust cover strike plate 64 are formed substantially independently in the circumferential direction, with recessed slots 70 extending in the radial direction of the lower spring seat 58 being formed between adjacent abutment projections 66. Therefore, mud etc. falling on the lower spring seat 58 passes through recessed slots 70 and collects at the inner periphery of the lower spring seat 58, where it can drain out quickly through the water drain opening 53 formed in the lower spring support member 48. This makes it possible to effectively avoid the problem of mud or the like collecting on the lower spring seat 58 and promoting corrosion of the coil spring 44 or deterioration of the lower spring seat 58. The recessed slots 70 can also function as passages for intake and expulsion of air, facilitating intake or expulsion of air between the dust cover 60 interior and outside during expansive/contractive deformation of the dust cover 60, as well as to avoid unwanted noise in association with intake and expulsion of air, or irregular deformation of the dust cover 60 in association with air pressure changes.

While the presently preferred embodiment of this invention has been described above in detail by illustrative purpose only, it is to be understood that the invention is not limited to the details of the illustrated embodiment, but may be otherwise embodied.

For example, whereas in the illustrated embodiment, the dust cover 60 is integrally formed on the upper spring seat 56, the invention may be implemented similarly in a suspension mechanism comprising the dust cover 60 constituted as a separate element from the upper spring seat 56.

The invention may be reduced to practice in suspension mechanisms of various kinds, irrespective of the specific construction of the shock absorber 30, upper support 40 and the like. For instance, it may be implemented similarly in a rear suspension mechanism, which typically has no bearing 52.

Further, whereas in the illustrated embodiment employs the lower spring support member 48 whose inner circumferential portion constitutes the tapered portion 51, there are no particular limitations as regards specific shape of the lower spring support member. It would of course be possible to dispose a dust cover strike plate of construction according to the invention on a lower spring support member of generally flat shape lacking such a tapered portion 51.

The dust cover strike plate may be fabricated of various kinds of materials other than the rubber elastic body given by way of example. Expanded urethane or other materials furnished with an appropriate degree of resilience are acceptable for use as well. In particular, a portion of the dust cover strike plate, which is superimposed on the lower spring support member 48, and does not construct a projecting distal edge face, may be fabricated of hard or rigid material.

It is also to be understood that the present invention may be embodied with various other changes, modifications and improvements, which may occur to those skilled in the art, without departing from the spirit and scope of the invention defined in the following claims.

What is claimed is:

1. A dust cover strike plate for use in a suspension mechanism including a shock absorber installed between a wheel side and a body side of an automobile with a cylinder thereof mounted on the wheel side and a piston rod thereof mounted on the body side, a coil spring disposed externally about the shock absorber with an upper end thereof supported by an upper spring support member disposed on the body side and an lower end thereof supported by a lower spring support member fixed on and projecting from an outer circumferential surface of the cylinder of the shock absorber while being inclined with respect to an center axis of the shock absorber, and a tubular dust cover disposed externally about the shock absorber with an upper end thereof supported by a fixing portion of the piston rod that is fixed to the body side so as to be arranged radially inward of the coil spring in a hanging fashion, the dust cover strike plate being adapted to be superimposed on and attached to an inner circumferential portion of an upper face of the lower spring support member that support the lower end of the coil spring, and comprising:

an abutting face situated opposite to an axial lower end of the dust cover in an axial direction of the shock absorber, and having axial projection height from the lower spring support member that is varied in a circumferential direction of the shock absorber corresponding to an incline angle of the lower spring support member with respect to the center axis of the shock absorber so that the abutting face situated opposite to the axial lower end of the dust cover is arranged on a plane substantially perpendicular to the center axis of the shock absorber, wherein the axial lower end of the dust cover is brought into abutting contact with the abutting face during contracting motion of the absorber, wherein the dust cover strike plate comprises a solid abutment projection whose upper face provides the abutting face of the dust cover strike plate, and whose lower face is superposed in close contact with the upper face of the lower spring support member without a spacing therebetween in the axial direction except an inner peripheral edge thereof, and wherein a portion of the upper face of the lower spring support member, which is held in close contact with the lower face of the solid abutment projection is inclined with respect to the center axis of the shock absorber.

2. A dust cover strike plate according to claim 1, wherein the abutting face is divided into a plurality of abutting face sections in the circumferential direction so as to form drain passages situated between adjacent abutting face sections in the circumferential direction.

3. A dust cover strike plate according to claim 2, wherein each of the drain passages has a recessed slot shape extending in an radial direction of the lower spring support member and connected to a water drain opening formed at a location along an inner periphery of the lower spring support member.

4. A dust cover strike plate according to claim 1, wherein the inner circumferential portion of the lower spring support member has a tapered configuration that inclines axially downward of the shock absorber, while going towards an inner periphery thereof, and the dust cover strike plate has a tapered face corresponding to the tapered configuration of the lower spring support member at a lower face thereof, which is superimposed against an upper face of the inner circumferential portion of the lower spring support member so that the dust cover strike plate is superimposed and positioned against the upper face of the lower spring support member.

5. A dust cover strike plate according to claim 1, wherein the dust cover strike plate is integrally formed with an inner peripheral edge portion of a lower spring seat that is superimposed on the upper face of the lower spring support member so as to be situated between the upper face of the lower spring support member and the coil spring.

6. A dust cover strike plate according to claim 5, further comprises an annular base portion composed of the inner circumferential portion of the lower spring seat, and a plurality of abutment projections of block configuration that project upward at several locations along a circumference of the base portion so as to provide a plurality of abutting face sections circumferentially spaced away from one another, and that cooperate together to provide the abutting face.

7. A suspension mechanism comprising:
a shock absorber to be installed between a wheel side and a body side of an automobile with a cylinder thereof fixable to the wheel side and a piston rod thereof fixable to the body side;

a coil spring disposed externally about the shock absorber with an upper end thereof supported by an upper spring support member disposed on the body side and a lower end thereof supported by a lower spring support member fixed on and projecting from an outer circumferential surface of the cylinder of the shock absorber, while being inclined with respect to an center axis of the shock absorber;

a tubular dust cover disposed externally about the shock absorber with an upper end thereof supported by a fixing portion of the piston rod that is fixed to the body side so as to be arranged radially inward of the coil spring in a hanging fashion, and being formed as a generally cylindrical elastic body having a stretching/contracting portion of bellows configuration situated at least in an axially medial portion thereof; and a dust cover strike plate superimposed on and attached to an inner circumferential portion of an upper face of the lower spring support member, and including an abutting face situated opposite to an axial lower end of the dust cover in an axial direction of the shock absorber, and having axial projection height from the lower spring support member that is varied in a circumferential direction of the shock absorber corresponding to an incline angle of the lower spring support member with respect to the center axis of the shock absorber so that the abutting face situated opposite to the axial lower end of the dust cover is arranged on a plane substantially perpendicular to the center axis of the shock absorber, the axial lower end of the dust cover being brought into abutting contact with the abutting face during contracting motion of the shock absorber, wherein the dust cover strike plate comprises a solid abutment projection whose upper face provides the abutting face of the dust cover strike plate, and whose lower face is superposed in close contact with the upper face of the lower spring support member without a spacing therebetween in the axial direction except an inner peripheral edge thereof, and wherein a portion of the upper face of the lower spring support member, which is held in close contact with the lower face of the solid abutment projection is inclined with respect to the center axis of the shock absorber.

* * * * *